United States Patent
Seidel et al.

(12) 
(10) Patent No.: US 6,622,581 B2
(45) Date of Patent: Sep. 23, 2003

(54) APPARATUS AND METHOD FOR CONTROLLING AN AUTOMATIC TRANSMISSION

(75) Inventors: Willi Seidel, Eberdingen (DE); Josef Petersmann, Wimsheim (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/982,235

(22) Filed: Oct. 19, 2001

(65) Prior Publication Data

US 2002/0046894 A1 Apr. 25, 2002

(30) Foreign Application Priority Data

Oct. 20, 2000 (DE) .......................... 100 52 880

(51) Int. Cl.$^7$ ................................. F16H 59/08
(52) U.S. Cl. ........................ 74/335; 477/120
(58) Field of Search ..................... 74/335, 336 R; 477/120, 97, 904

(56) References Cited

U.S. PATENT DOCUMENTS 6,035,735 A * 3/2000 Graf et al. ............... 74/335
6,363,805 B1 * 4/2002 Marchart .................. 74/335

FOREIGN PATENT DOCUMENTS

| DE | 43 11 886 A1 | 10/1994 |
|---|---|---|
| DE | 4311886 | 10/1994 |
| DE | 19736406 | 3/2000 |
| DE | 199 12 963 A1 | 9/2000 |
| DE | 19912963 | 9/2000 |

OTHER PUBLICATIONS

*Automobiltechnische Zeitschrift* [*Journal of Automotive Engineering*], No. 6/1990, pp. 308–319, by Von Ulrich Maier et al.
*Automobil Revue* [*Automobile Journal*], No. 51/1992, p. 23, entitled Porsche macht Stufenlos–Automatik attraktiv.
*De–Z Auto Motor Sport*, No. 22/1991, p. 300.

* cited by examiner

Primary Examiner—Charles A. Marmor
Assistant Examiner—Dennis Abdelnour
(74) Attorney, Agent, or Firm—Crowell & Moring LLP

(57) ABSTRACT

An apparatus and method for controlling an automatic transmission having a controller that changes temporarily from the automatic operating mode, position D to a driver-influenced operating mode if a second rocker switch, which is arrange on the steering wheel, is activated. The automatic operating mode is not discontinued permanently, because after a set time has elapsed, the automatic operating mode becomes active again. Returning to the automatic operating mode is only possible if the current transverse acceleration is below a preset limiting value, and traction operation is in effect at the same time. The remaining time before returning to the automatic operating mode is set to a minimum value, after the manual operating mode has briefly been called up, as soon as one of the referenced conditions, which causes a return to the automatic operating mode to be suppressed, is no longer in effect.

6 Claims, 2 Drawing Sheets

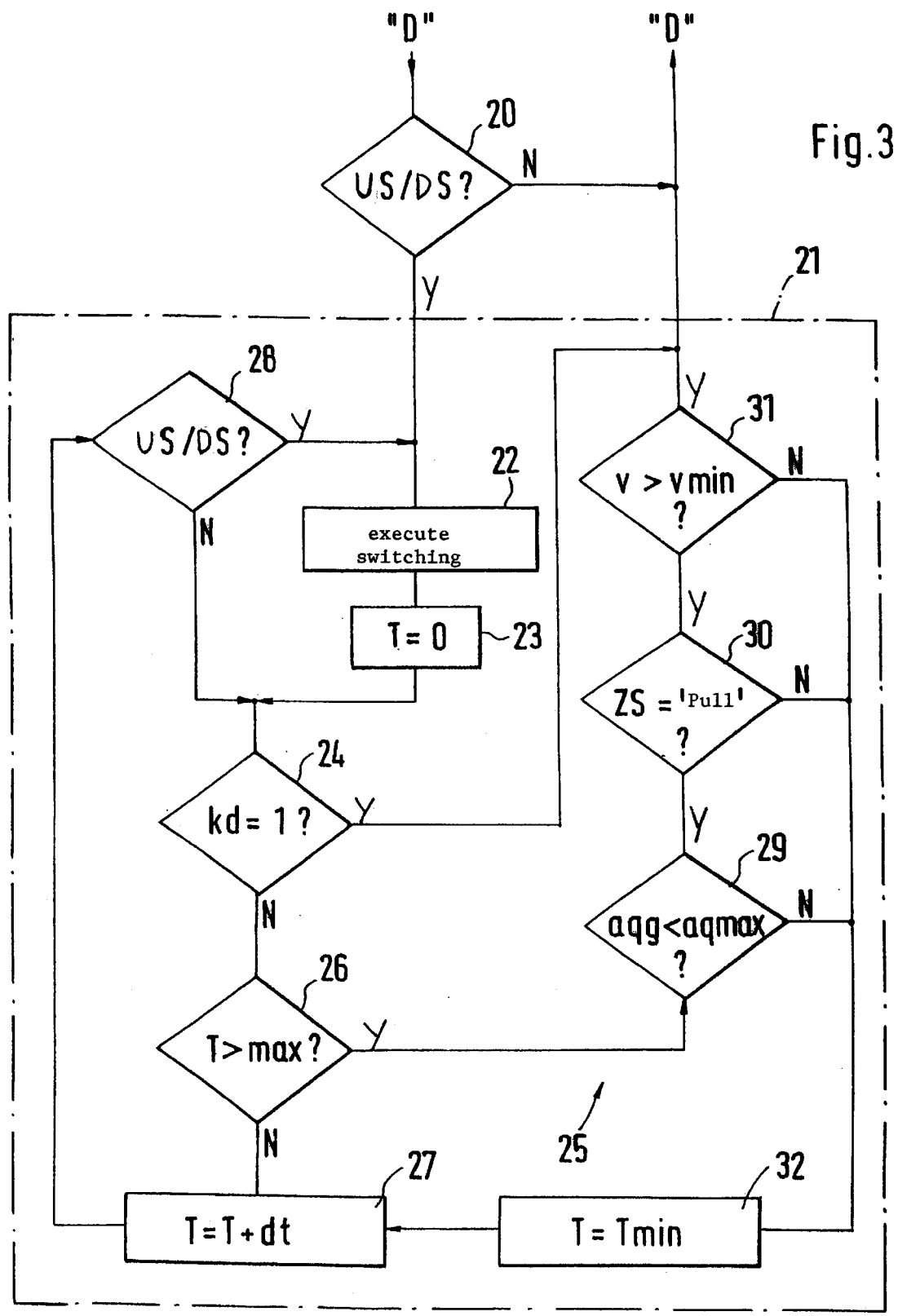

APPARATUS AND METHOD FOR CONTROLLING AN AUTOMATIC TRANSMISSION

BACKGROUND AND SUMMARY OF THE INVENTION

This application claims the priority of German Application No. 100 52 880.5 filed Oct. 20, 2000, the disclosure of which is expressly incorporated by reference herein.

The present invention relates to an apparatus and a method for controlling an automatic transmission.

In order to give drivers of motor vehicles with automatic transmissions the opportunity to influence the selected speed increasing ratio directly in special situations, it is known in the art, from "Automobiltechnische Zeitschrift" [Journal of Automotive Engineering], No. 92, Issue 6/1990, pp. 308–319, to envision a manual operation in addition to an automatic operation. In the manual operation, the driver is allowed to select individual speeds of the self-changing gear directly. For this purpose, a second gear-shift channel is envisioned for the manual operation that is parallel to a gear-shift channel for the automatic operation, thus allowing the driver to downshift or upshift in one-gear increments, respectively, by way of the seesaw-like movement of a gear-shift lever. A similar apparatus for infinitely variable change-speed gears is known in the art from CH-Z "Automobil Revue" [Automobile Journal], No. 51/1992, p. 23.

Also known in the art is the possibility of initiating a gear change in a transmission, which is controlled by a separate force, using a selection device on a steering wheel of a motor vehicle (for example, DE-Z "Auto Motor Sport," No. 22/1991, p. 300).

German patent document DE 43 11 886 A1 discloses an apparatus and a method for controlling an automatic transmission. The controller changes from an automatic operating mode to a manual operating mode if, by means of a travel length switch, a position M is lightly tapped, or if, by means of a rocker switch envisioned on the steering wheel, a switch signal is produced for a preset amount of time, e.g. 0.7 seconds. If a position M is lightly tapped once again with the travel length switch, or if for a preset amount of time, e.g. 1.5 seconds, an upshift signal is given, operation in the manual operating mode is discontinued. Finally, it is possible to envision that the driver-influenced operating mode is discontinued if that operating mode was activated over a preset amount of time. In general, however, this process always involves changing over from the automatic to the manual operating mode and vice versa.

German patent document DE 199 12 963 A1 already discloses an apparatus and a method for controlling an automatic transmission having a controller which intermittently changes from the automatic operating mode, that is normally selected in a position D of a travel length switch, without selection by the first selection device, to the driver-influenced operating mode, if a second rocker switch, arranged on the steering wheel is activated. Thus, the automatic operating mode is not discontinued permanently, because, after a preset amount of time has elapsed, the automatic operating mode is reactivated. Every time the rocker switch is activated, the time starts running anew. Returning to the automatic operating mode is only possible if the current transverse acceleration is below a preset limiting value and if traction operation is simultaneously in effect.

It is the subject-matter of the present invention to create an apparatus and a method that provide improved driveability.

According to the invention, this objective is achieved with the characteristics set forth herein. The invention proposes that, subsequent to a brief selection of the second, driver-influenced operating mode, the remaining time before returning to the automatic operating mode be set to a minimum value as soon as one of the referenced conditions, that suppress a return to the automatic operating mode, no longer apply. Thus, advantageously, it is achieved that, after one of the referenced conditions no longer applies, a return to the automatic operating mode does not occur immediately; but a minimum dwell time in the manual operating mode is ensured. The invention thus relies on the realization that the driving states, which cause continued dwelling in the manual operating mode even after the preset time in the manual operating mode has elapsed, can be interrupted for a brief amount of time without simultaneously creating a need to change to the automatic operating mode. Consequently, the overall gear-shift properties of the transmission, in particular the selection of its modes of operation, are therefore improved in terms of their predictability and clarity for the driver. The kinds of referenced conditions that effect a return to the automatic operating mode are not significant in the present context as long as said conditions indicate special driving states. The value for the minimum dwell time should be, preferably, in the range of 25% of the time spent in the manual operating mode.

The method claims share the effects and advantages of the corresponding apparatus claims.

Other objects, advantages and novel features of the present invention will become apparent from the following detailed description of the invention when considered in conjunction with the accompanying drawings.

BRIEF DESCRIPTION OF THE DRAWINGS

FIG. 3 is a flow diagram of the method according to the invention.

DETAILED DESCRIPTION OF THE DRAWINGS

Figure 1:
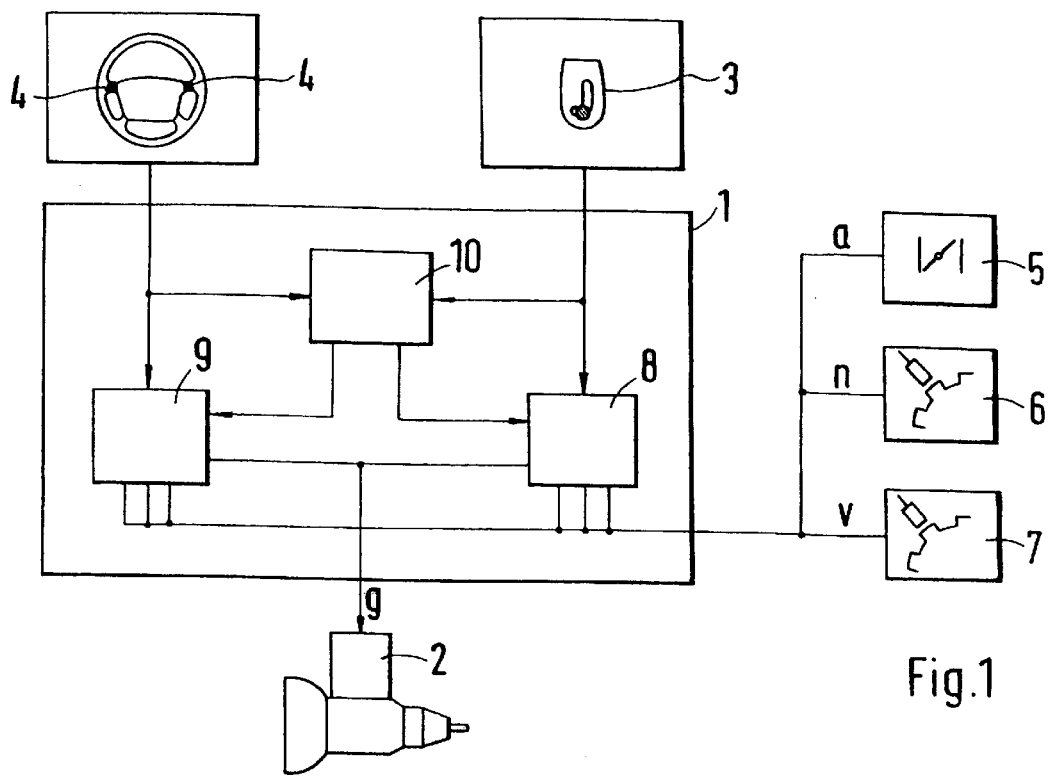
FIG. 1 is a block diagram of the control device according to the invention.

A control device 1, shown in FIG. 1, controls an automatic transmission 2 and receives signals from a travel length switch 3 ("drive step switch"), from a rocker switch 4, which is arranged on a steering wheel, as well as from a throttle sensor 5, an engine speed sensor 6 and a travel speed sensor 7. The automatic transmission 2 receives a gear signal g from the control device 1 and activates the gear speed that is called-up by way of the gear signal g. The travel length switch 3 features a first gear-shift channel for activating a first, automatic operating mode, including the positions and driving levels P, R, N, D, 3, 2, 1. In position P, intended for the purpose of parking the vehicle, the transmission is blocked on the output side. In the position R, the vehicle is put in reverse. No gear is activated if the position N is chosen. In the position D, the transmission gear g to be activated, is determined on the basis of the operating parameters of the vehicle. The positions 3, 2 and 1 correspond to position D, while, however, the highest transmission gear g, that is to be activated, is determined based on the position of travel level switch 3. Positions 3, 2 and 1 are optional.

Relying on this first channel, a recess, designated as M, is envisioned opposite to the level setting D. A selection lever, which is envisioned as an operating element of the travel length switch 3, snaps into all of the positions. The rocker switch 4 is arranged on the steering wheel in such a manner that it is within the reach of the driver, featuring a neutral middle position and two switch positions, in particular an upshift setting (US) and a downshift setting (DS), from where it automatically returns to the neutral middle position after having been activated. The two switch positions trigger corresponding upshift (US) or downshift (DS) signals. The throttle sensor 5 supplies the control device 1 with a throttle signal a, the engine speed sensor 6 with an engine speed signal n and the travel speed sensor 7 with a travel speed signal v.

The control device 1 is equipped with a first unit to determine the speed increasing ratio 8 for the first, automatic operating mode and a second unit to determine the speed increasing ratio 9 for the second, driver-influenced operating mode, as well as a differentiation device 10. The first unit to determine the speed increasing ratio 8 receives the signals from the travel length switch 3 and establishes on their basis, depending on the operating values of the throttle signal a, the engine speed signal n and the travel speed signal v, the gear level that needs to be set. This information, in turn, is passed on in the form of a gear level signal g to the transmission 2. The second unit to determine the speed increasing ratio 9 receives the switch signals HS/RS from the rocker switch 4 and generates on their basis the gear level signal g, while the operating values consisting of the throttle signal a, the engine speed signal n, the travel speed signal v are taken into account for plausibility checks and safety measures, such as overspeed protection, stalling protection, etc. The gear level signal g is not released until the flank of the HS/RS switch signal decreases, i.e. when the rocker switch 4 is released.

The differentiation device 10 evaluates the signals from the travel length switch 3 and from the rocker switch 4 and determines whether to activate the first unit to determine the speed increasing ratio 8 or the second unit to determine the speed increasing ratio 9.

Figure 2:
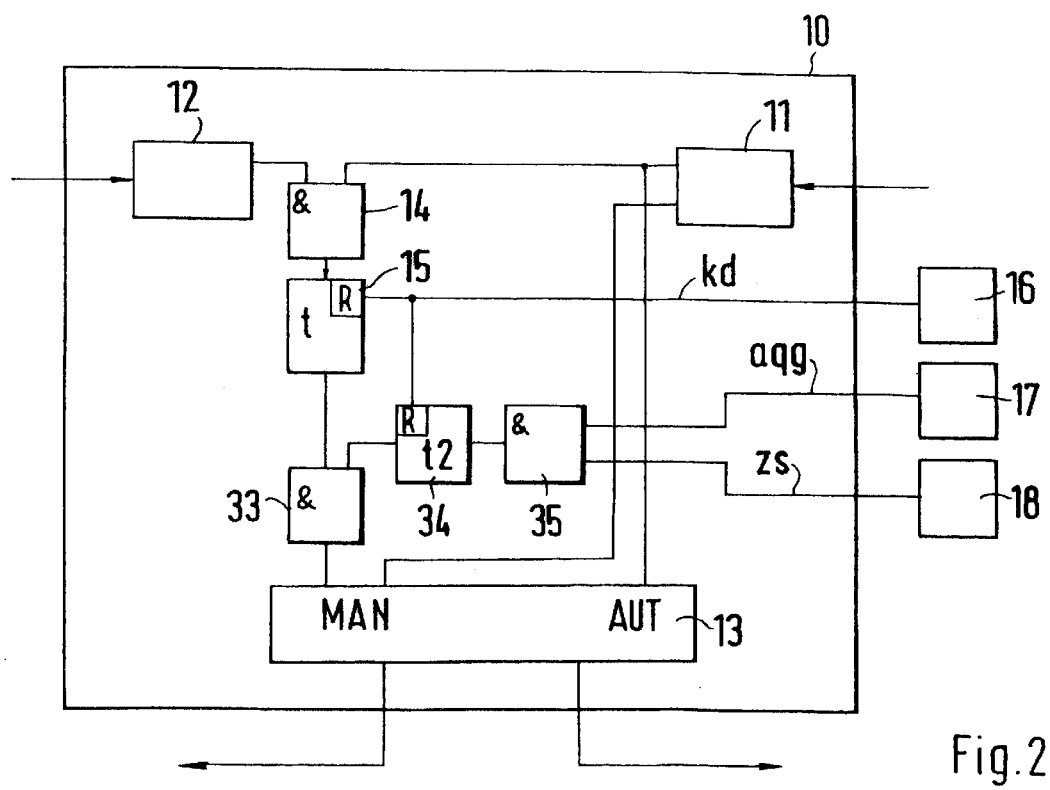
FIG. 2 is a block diagram of a change-over device in FIG. 1.

The structure of the differentiation device 10 is described in FIG. 2. A first signal evaluation device 11 is connected with the travel length switch 3, and a second signal evaluation device 12 is connected with the rocker switch 4. The output signals of the signal evaluation devices 11, 12 are directed to a change-over device 13, which in turn activates either the first unit to determine the speed increasing ratio 8 or the second unit to determine the speed increasing ratio 9, but never both at the same time. An input AUT and an input MAN are envisioned for this purpose on the change-over device 13. A signal at the input AUT causes the change-over device 13 to activate the first unit to determine the speed increasing ratio 8 and to select thereby the automatic operating mode. A signal at the input MAN activates the second unit to determine the speed increasing ratio 9 and selects the driver-influenced operating mode (by means of the rocker switch 4). Both inputs, MAN and AUT, can receive several signals and are also able to establish logical connections between them, if necessary.

The first signal evaluation device 11 recognizes, based on the evaluation of the signal from the travel length switch 3, if the latter is in the M-position. If this is the case, it transmits a signal to input MAN of the change-over device 13, thereby causing the driver-influenced operating mode to be selected now. If the first signal evaluation device 11 establishes that the travel length switch 3 is no longer in the M-position, it transmits a signal to input AUT of the change-over device 13, thereby selecting the automatic operating mode. In general, for as long as the travel length switch 3 is located in the D-position, the change-over device 13 activates the first unit to determine the speed increasing ratio 8, and, for as long as the travel length switch 3 is located in the M-position, it activates the second unit to determine the speed increasing ratio 9.

The second signal evaluation device 12 analyzes the signal from the rocker switch 4; in particular it checks as to whether an upshift signal HS or a downshift signal RS is present. If so, a signal is transmitted to a logical AND gate 14. The other input of the AND gate 14 is connected with an output of the first signal evaluation device 11, which sends a signal if the travel length switch 3 is in position D.

The output of the AND gate 14 is directed to a delay element 15 containing a disconnect delay of programmable duration t. The output of the delay element 15 is connected to the input MAN of the change-over device 13. Also, at a reset input R, the delay element 15 receives a signal kd from a kick-down switch 16. If the delay element receives a signal kd, it is immediately reset and no longer sends any signals.

An AND gate 33, whose second input receives a signal from a second delay element 34 containing a programmable disconnect delay t2, is envisioned between the delay element 15 and the input MAN of the change-over device 13. The second delay element 34 receives the signal of an AND gate 35 that connects the aqg signals of a transverse acceleration limiting value sensor 17 and zs-signal of a traction sensor 18 with each other. The transverse acceleration limiting value sensor 17 transmits the signal aqg if the transverse acceleration exceeds a previously set value aqmax. The traction sensor 18 issues the signal zs when thrust operation is in effect. The time duration t2 is selected here as approximately 25% of the duration t of the delay element 15. The second delay element 34 also receives a signal kd from a kick-down switch 16 at a reset input R.

Instead of using the logical circuit including AND gates 14, 33 and 35 and the delay elements 15 and 34, the previously described processing of the switch signal HS/RS, of signal D from the travel length switch 3 as well as of the signals kd, aqg and zs can also take place in the change-over device 13 to the same effect.

The apparatus above operates as follows: First, the vehicle operates in the automatic operating mode, i.e., the gear speed to be set is determined automatically on the basis of the operating values of the motor vehicle. If the driver wishes to change to the second, driver-influenced operating mode, he/she moves the travel length switch 3 from the D-position to the M-position. Now, the driver can trigger upshifts or downshifts using the rocker switch 4, that is integrated in the steering wheel, by activating the rocker switch correspondingly in order to effect an upshift action or downshift action. If the vehicle reaches the operating limits for the controller (overspeed, stalling etc.) with regard to the gear speed that is currently set, a circuit is triggered to return the vehicle to the allowable operating limits even without a driver-activated switch command.

In the alternative, the driver can briefly achieve the second, driver-influenced operating mode by requesting an upshift or downshift using the rocker switch 4, while the travel length switch 3 is in the position D. In this case, in addition to changing to the second operating mode, subsequent to the change, the requested gear change is implemented because the signal from the rocker switch 4 is directed to the second unit to determine the speed increasing ratio 9 (triggering the gear level signal g with the negative flank of the switching signals HS/RS).

The first, automatic operating mode is automatically reselected when the programmed time duration t after the upshift or downshift switching signal, HS or RS, has expired, when the rate of the transverse acceleration is below a preset limiting value and no thrust operation exists. If a signal kd from a kick-down switch 16 is present during this brief call-up of the second, driver-influenced operating mode, the first automatic operating mode is reselected immediately. However, if thrust operation is detected during the brief call-up of the second, driver-influenced operating mode, or if the rate of the transverse acceleration exceeds the preset limiting value, the delay element 34 ensures that, once a change into the first operating mode is possible again, the second operating mode can be discontinued only after the time interval t2 has elapsed.

Naturally, the control device 1 can also be realized as a microcomputer. Such a microcomputer operates in accordance with a written to perform the process described below. First, in the initial automatic operating mode, the control device 1 selects by means of a group of steps, that are not shown here, the transmission 2, in particular by way of determining the gear speed that is to be set. This is done with the assistance of stored performance characteristics based on the operating values of the throttle signal a, engine speed signal n and travel speed signal v. The control device then issues a request for this gear speed to the transmission 2. The signal from rocker switch 4 is called up at some time during this process. Step 20, illustrated in FIG. 3, is part of this query. Step 20 checks if the rocker switch 4 generated an upshift (HR) or downshift (RS) signal. If not, the control device 1 remains in its automatic operating mode, which is denoted here with travel level D. If, on the other hand, an upshift (HS) or downshift (RS) signal is present, the program branches-off to allow for short-time manual influencing 21 of the transmission.

In its first step 22, the program 21 begins with the execution of the switching operation requested by the upshift (HS) or downshift (RS) signal. This first step 22 is not envisioned in an alternative realization of the method, provided the program 21 is initially called up only by way of a first upshift (HS) or downshift (RS) signal, but without effecting any switching action right away. A time counter T is reset to the value zero in the next step 23.

A kick-down signal kd is called up in step 24. In the presence of such a signal, the routine branches-off as noted by arrow 25. If not, the program continues with step 26, which determines whether the counter T reached its maximum value—in the present case, this corresponds to 8 seconds. If the maximum value is reached or exceeded, a branch-off to the routine 25 occurs, and, if not, the program continues with step 27, increasing the time counter T by a time increment dT.

In the subsequent step 28, another check is implemented to determine whether an upshift (HS) or downshift (RS) signal is present. If so, the program flow continues with step 22; if not, a direct branch-off to step 24 occurs.

The exit routine 25 consists of three testing steps, in particular steps 29 to 31. In the first testing step 29 it is determined if the signal aqg for the transverse acceleration of the vehicle is below a previously set maximum value aqmax. The next step 30 establishes whether the signal zs indicates a pull operation of the vehicle. Finally, step 31 checks as to whether the vehicle's travel speed v is greater than a minimum value of vmin, which is 5 km/h in the present case.

If all of the conditions that were examined in steps 29 to 31 are satisfied, then program 21 is exited. If, on the other hand, one of the three conditions is not met, then in step 32, the time counter T is set to a value Tmin, which assumes a value of 75% of the maximum value checked in step 26 for the present example.

Regarding the signal zs of the traction/thrust detector 18, in the present embodiment the signal zs assumes the value "thrust" (the s of zs) if the vehicle is standing or running at low speeds (less than 5 km/h). During normal driving operation, however, the signal zs acts in the known fashion, determined on the basis of the throttle position DK or other alternate methods. Thus, as a result, during steps 30, 31, the program 21 cannot be exited if the vehicle is standing or running, and when the gas pedal is not activated. It is possible, for instance, to select the first gear as a starting speed by activating the rocker switch 4, whereas at gear position D in the automatic operating mode, the second gear is regularly used as the starting speed.

Obviously, while the program 21 is active, implementing any automatic switching operations is not permitted. Other special functions that might be provided during the driving step D are terminated when the program 21 is executed. However, switching processes that were initiated by these other programs will still be completed. Consequently, the program 21 has priority over all other switching programs with the exception of safety measures, such as overspeed protection and stalling protection.

In an infinitely variable change-speed gear the gear levels, which may correspond to preset speed increasing ratios in an infinitely variable change-speed gear, are replaced by the speed increasing ratio of the transmission that can be influenced by the driver in the second operating mode, in particular by increasing or reducing the speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for controlling a transmission of a motor vehicle, comprising:
  a control device coupled to control the transmission, said control device being operable in two modes, a first automatic operating mode which essentially automatically sets speed increasing ratios in accordance with operating values determined by sensors, and a second, driver-influenced operating mode which adjusts the speed increasing ratios of the transmission in dependence on a second selection device, said first and second operating mode being selected by way of a first selection device;
  wherein the control device is switchable from the first operating mode to the second operating mode without operating the first selection device by activating the second selection device for an amount of time with a specified first duration, wherein the second operating mode continues to be in effect even after the specified first duration has passed for as long as at least one of the following driving conditions is fulfilled:
    a signal from a transverse acceleration limiting value sensor exceeds a preset rate;
    a signal from a traction/thrust sensor indicates a thrust operation; and
    a travel speed is less than a preset limiting value;
    wherein a period for continuing to remain in the second operating mode is set to a specified minimum value for an additional time period when none of the driving conditions are any longer met.

2. The apparatus according to claim 1, wherein the control device comprises a differentiation device that evaluates signals of the first and second selection devices and activates a first unit to determine a speed increasing ratio for the first automatic operating mode or a second unit to determine a speed increasing ratio for the second driver-influenced operating mode;

wherein the differentiation device has first and second signal evaluation devices, a change over device, and a delay element for monitoring the preset amount of time, said delay element being arranged between the second signal evaluation device and the change-over device and operating to issue for a length of the preset amount of time, in response to an output signal of the second signal evaluation device, a signal to the change-over device;

wherein the delay element receives a signal of the transverse acceleration limiting value sensor and the signal from the traction/thrust sensor, an output signal of the delay element being set to a minimum value if the signal of the transverse acceleration limiting value sensor exceeds a preset rate and the signal of the traction/thrust sensor indicates a change to a thrust operation.

3. The apparatus according to claim 2, wherein the control device is a micro-computer.

4. The apparatus according to claim 1, wherein the control device is a micro-computer.

5. A method for controlling an automatic transmission for a motor vehicle having a control device that controls the transmission, first and second selection devices, as well as sensors for sensing operating values of the vehicle, the method comprising the acts of:

implementing a first, automatic operating mode in accordance with the first selection device based on a first group of steps;

changing for a specified first duration from the first group of steps to the second group of steps if a call-up action of the second selection device indicates that the second selection device is transmitting a signal; and changing from the second group of steps to the first group of steps if a preset dwell time in the second group of steps has elapsed, while suppressing any change even after the specified first duration has passed, from the second group of steps to the first group of steps for at least as long as at least one of the following driving conditions is met:

a signal of a transverse acceleration sensor exceeds a preset limiting value, a signal of a traction/thrust sensor indicates a thrust operation, or a signal from a travel speed sensor of the vehicle falls below a preset limiting value, wherein a time frame for continuing to remain in the second operating mode is set to a specified minimum time for an additional dwell time if none of the driving conditions are any longer met.

6. A control device, comprising:

a microcomputer; and a computer readable medium having stored thereon a program for performing the method in accordance with claim 5.

* * * * *